United States Patent
Aoyama

(10) Patent No.: US 9,184,636 B2
(45) Date of Patent: Nov. 10, 2015

(54) ELECTRIC ROTATING MACHINE

(71) Applicant: SUZUKI MOTOR CORPORATION, Shizuoka (JP)

(72) Inventor: Masahiro Aoyama, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 139 days.

(21) Appl. No.: 13/740,301

(22) Filed: Jan. 14, 2013

(65) Prior Publication Data

US 2013/0193783 A1 Aug. 1, 2013

(30) Foreign Application Priority Data

Feb. 1, 2012 (JP) ................................. 2012-020224

(51) Int. Cl.
| | |
|---|---|
| H02K 1/27 | (2006.01) |
| H02K 21/12 | (2006.01) |
| H02K 21/14 | (2006.01) |
| H02K 29/03 | (2006.01) |
| H02K 1/16 | (2006.01) |

(52) U.S. Cl.
CPC ................ *H02K 1/2706* (2013.01); *H02K 1/16* (2013.01); *H02K 1/2766* (2013.01); *H02K 21/14* (2013.01); *H02K 29/03* (2013.01); *H02K 2213/03* (2013.01)

(58) Field of Classification Search
CPC ..... H02K 21/14; H02K 29/03; H02K 1/2706; H02K 1/2766; H02K 1/16; H02K 2213/03
USPC .............. 310/156.01–156.84, 156.53, 156.56
See application file for complete search history.

(56) References Cited

U.S. PATENT DOCUMENTS

| | | | |
|---|---|---|---|
| 2004/0095035 A1* | 5/2004 | Sogabe et al. | |
| 2005/0253475 A1* | 11/2005 | Cervenka et al. | 310/216 |

(Continued)

FOREIGN PATENT DOCUMENTS

| | | |
|---|---|---|
| EP | 1 978 619 A1 | 10/2008 |
| JP | 2000-197292 A | 7/2000 |

(Continued)

OTHER PUBLICATIONS

The First Office Action mailed Dec. 4, 2014 in corresponding Chinese Patent Application No. 201210594970.X (with an English translation) (13 pages).

(Continued)

*Primary Examiner* — Joshua Benitez-Rosario
*Assistant Examiner* — Leda Pham
(74) *Attorney, Agent, or Firm* — Rothwell, Figg, Ernst & Manbeck, P.C.

(57) ABSTRACT

An electric rotating machine includes a stator having a plurality of stator teeth facing a rotor. The rotor has a plurality of pairs of permanent magnets. Permanent magnets of each pair are located in a "V" shape configuration and form a magnetic pole. Every other tooth of the plurality of stator teeth is a long stator teeth and an adjacent tooth is a short stator teeth. Adjusting recesses formed in the rotor are at symmetrical, about a d-axis of each magnetic pole, locations in a way that each of the adjusting recesses has a width made equal to a width of one of the stator teeth and their deepest levels are equidistant from a d-axis of the magnetic pole in one and the opposite circumferential directions angularly about the axis of the rotor by 56° in electrical degrees.

2 Claims, 13 Drawing Sheets

(56) References Cited

U.S. PATENT DOCUMENTS

| | | | |
|---|---|---|---|
| 2007/0257576 A1 | 11/2007 | Adaniya et al. | |
| 2009/0243423 A1* | 10/2009 | Hattori | |
| 2009/0261679 A1* | 10/2009 | Sakai et al. | 310/156.53 |
| 2010/0194228 A1 | 8/2010 | Lee et al. | |
| 2011/0169369 A1 | 7/2011 | Liang et al. | |

FOREIGN PATENT DOCUMENTS

| | | |
|---|---|---|
| JP | 2006-304546 A | 11/2006 |
| JP | 2007-312591 A | 11/2007 |
| JP | 2008-99418 A | 4/2008 |

OTHER PUBLICATIONS

Office Action mailed Oct. 23, 2014 in corresponding DE Patent Application No. 10 2013 100 742.0 (with an English translation) (9 pages).

The Second Office Action mailed Jul. 24, 2015 in corresponding Chinese Patent Application No. 201210594970.X (with an English translation) (9 pages).

\* cited by examiner

ELECTRIC ROTATING MACHINE

RELATED APPLICATION

The present application claims priority to Japanese Patent Application No. 2012-020224 filed on Feb. 1, 2012, the entire content of which is being incorporated herein by reference.

TECHNICAL FIELD

The present invention relates to an electric rotating machine and more particularly to a permanent magnet electric machine capable of acting as an electric motor providing high quality drive.

BACKGROUND ART

Electric rotating machines are required to have varying characteristics with different types of equipment in which they are used. For example, it is required that an electrical machine acts as a variable speed motor over a wide range as well as a high torque motor for low revolution speed operation when it is used, as a traction motor, in a hybrid electric vehicle (HEV) with an internal combustion engine or an electric vehicle (EV) as a driving source.

It is proposed for an electric machine with such characteristics to construct by adopting an interior permanent magnet (IPM) structure in which a plurality of pairs of permanent magnets are embedded in a rotor in a way that the magnets of each pair are located in a "V" shape configuration opening towards the rotor periphery because it is advantageous to use a structure that can effectively utilize reluctance torque together with magnetic torque (see e.g. patent literature 1).

Adopting the IPM structure enables an electric machine to make effective use of reluctance torque because q-axis magnetic path is kept by permanent magnets of each pair, embedded in a rotor, located in a "V" shape configuration. This increases the proportion of reluctance torque to magnetic torque and also saliency ratio (Ld/Lq), a ratio between inductance in d-axis and inductance in q-axis, resulting in increased tendency of space harmonics of the higher order to overlap flux waveform. The direct axis or d-axis is aligned with a direction of flux generated by magnetic poles and acts as a center axis between each pair of permanent magnets located in "V" shape, while the quadrature axis or q-axis is at an angle of 90 in electric degrees from the d-axis electrically and magnetically and acts as a center axis between the adjacent magnetic poles (i.e., the adjacent pairs of permanent magnets).

This causes high torque ripple, i.e., the difference between maximum and minimum torque during one revolution, in such electric rotating machine. The high torque ripple causes an increase in oscillation of the machine and electromagnetic noise. Especially, electromagnetic noise is desired to be reduced as much as possible because it gives an unpleasant sound to occupant(s) in a vehicle having, as an electric drive, the electric machine due to a relatively high frequency of the electromagnetic noise to that of noise generated by drive of an internal combustion engine.

On the other hand, oscillation becomes loss to cause a reduction in efficiency of performance of the electric machine although highly efficient performance is demanded to generate a desired driving force efficiently with less consumption of electricity.

Following not only restrictions of loading space, but also recent demands of improvement in energy conversion efficiency (mileage) in hybrid and electric cars, there is a growing demand of lightweight and miniaturization in electric rotating machines capable of providing high energy density output. Reducing torque ripple is effective to control judder, abnormal vibrations, and to provide smooth acceleration performance because, for example, there is a need to provide highly efficient drive over a usually used range for driving a car in street use.

It is very difficult to combine miniaturization as stand-alone units with improved efficiency, reduced electromagnetic noise and low torque ripple because, in electric rotating machines (motors), there are a tendency of increase in electromagnetic noise and a tendency of decrease in efficiency caused due to occurrence of torque ripple in accordance with an increase in output density per unit volume, but the demand of lightweight and miniaturization is growing.

In order to realize low electromagnetic noise and low torque ripple, it is proposed to axially divide a rotor to allow one of the adjacent pairs of permanent magnets to assume an angularly twisted positional relation with the other or give a skew angle (see, for example, patent literature 2).

The above-mentioned measure to give a skew angle in an electric rotating machine causes not only an increase in assembly cost and thus an increase in production cost, but also a difference at interfaces of the adjacent pairs of permanent magnets and a deterioration of the rate of magnetization at the interfaces, causing the permanent magnets to lower their magnetic flux density. As a result, the output torque to be produced by the electric rotating machine drops.

This is why various different ideas from the measure to give a skew angle are proposed to realize low electromagnetic noise and low torque ripple. They include an approach to modify an air gap between a rotor and a stator surrounding the rotor in such a way that an air-gap length at a position where every p-axis intersects the air-gap is greater than air-gap lengths at the other positions by, for example, modifying the shape of the rotor periphery in such away that the rotor periphery has a bulged shape at every magnetic pole like a "petal" shape (see, for example, patent literatures 1, 3 and 4).

In electric rotating machines described in patent literatures 1, 3 and 4, an inductance at every p-axis, which serves as a magnetic axis of one of magnetic poles created by permanent magnets on a rotor, increases because an air gap is wide, causing not only a drop in saliency ratio and a drop in torque, but also a decrease in machine efficiency.

PRIOR TECHNICAL LITERATURE

Patent Literature

[Patent Literature 1] JP-A 2008-99418
[Patent Literature 2] JP-A 2006-304546
[Patent Literature 3] JP-A 2000-197292
[Patent Literature 4] JP-A 2007-312591

SUMMARY OF THE INVENTION

Thus, an object of the present invention is to provide an electric rotating machine capable of providing a high quality and efficient machine operation with reduced oscillation and noise by preventing any drop in torque output and lowering torque ripple.

According to the first aspect, there is provided an electric rotating machine comprising a rotor with a rotor shaft located on a rotor axis and a stator rotatably receiving the rotor, wherein the stator includes a plurality of stator teeth, each extending towards outer periphery surface of the rotor and terminating at inner periphery surface facing the outer periphery surface of the rotor, and a plurality of stator slots, each between the adjacent two of the stator teeth, providing spaces for winding coils around the stator teeth for input of driving electric power, wherein the rotor has a plurality of permanent magnets embedded therein so as to let magnetic force act on each of those stator teeth which face the permanent magnets, wherein the rotor within the stator is driven to rotate by reluctance torque derived from magnetic flux passing through the stator teeth, rear surface side of the stator teeth and the rotor when current passes through the coils and magnet torque in the form of attraction and repulsion derived from interference with the permanent magnets, and wherein, when each of a plurality sets of permanent magnets of the plurality of permanent magnets corresponds to one of a plurality of stator slots of the plurality of stator slots and forms one of magnetic poles, magnetic reluctance between the inner periphery surface per stator tooth of the plurality of stator teeth and the outer periphery surface of the rotor is modified by forming every other stator tooth of the plurality of stator teeth as a long stator tooth and an adjacent stator tooth as a short stator tooth in such a way as to adjust torque fluctuation per stator tooth of said plurality of stator teeth upon relative movement of the one magnetic pole to the set of stator slots, wherein the rotor is formed with a plurality of pairs of adjusting recesses, each pair per one of the magnetic poles, and the adjusting recesses of each pair are formed in the outer periphery surface of the rotor at symmetrical, about a central axis for the magnetic pole, locations.

According to the second aspect, in the electric rotating machine according to the feature specified by the above-mentioned first aspect, each of the magnetic poles in the rotor is formed by embedding one of the plurality of sets of permanent magnets so that permanent magnets of each set are a pair in number and located in a "V" shape configuration opening towards the outer periphery surface of the rotor, stator slots of each set are six in number, and the adjusting recesses of each pair have deepest levels equidistant from a d-axis of the magnetic pole angularly about the axis of the rotor by an electrical angle of 56 in electrical degrees.

According to the third aspect, in the electric rotating machine according to the feature specified by the above-mentioned second aspect, the plurality of stator teeth include long first stator teeth and short second stator teeth, and each of the adjusting recesses meets the condition as follows:

$$0.2 \leq Rt/xL \leq 0.4,$$

where Rt is the depth of the deepest level of each of the adjusting recesses and xL is the air gap distance between an inner periphery surface of each of the first long stator teeth and the outer periphery surface of the rotor.

According to the fourth aspect, in the electric rotating machine according to the feature specified by the above-mentioned second or third aspect, the plurality of stator teeth include long first stator teeth and short second stator teeth, each of the first long stator teeth and each of the second short stator teeth meeting the condition as follows:

$$0.1 \leq d/xL \leq 0.3,$$

where xL is the air gap distance between the inner periphery surface of each of the first long stator teeth and the outer periphery surface of the rotor, and d is the difference between the air gap distance xS between the inner periphery surface of each of the second short teeth and the outer periphery surface of the rotor and the air gap distance xL.

According to the aspects, torque fluctuation upon relative movement of the rotor to the stator, which is caused by passage of magnetic flux created during excitation of coils on the stator from the stator teeth to the rotor, is adjusted by modifying magnetic reluctance per stator tooth between the mutually facing stator teeth and the rotor within each of magnetic poles by forming every other tooth of the plurality of stator teeth as a long stator tooth and an adjacent tooth as a short stator tooth and by forming adjusting recesses in the outer periphery surface of the rotor at symmetrical, about a d-axis of each of the magnetic poles, locations. This makes it easy to adjust with high accuracy torque fluctuation that is created by passing of magnetic flux to the rotor per each of the stator teeth. For example, torque ripple can be lowered by making the torque fluctuation small. As a result, there are provided a high quality and efficient machine operation with reduced oscillation and noise and at the same time with reduced losses.

In the structure including, for example, first long stator teeth and second short stator teeth, in which each magnetic pole is formed by a set or a pair of permanent magnets corresponding to a set of six slots and adjusting recesses are formed with their deepest levels equidistant from the center axis for each of the magnetic poles in one and the opposite circumferential directions angularly about the axis of the rotor by an electrical angle of 56 in electrical degrees, the ratio of the depth (Rt) of the deepest level of each of the adjusting recesses with respect to the air gap distance (xL) between the inner periphery surface of one of the first long stator teeth and the outer periphery surface of the rotor is within a range from 0.2 to 0.4, and the ratio of the difference (d) between the air gap distance (xS) between the inner periphery surface of one of the second short stator teeth and the outer periphery surface of the rotor and the air gap distance (xL) between the inner periphery surface of one of the first long stator teeth and the outer periphery surface of the rotor with respect to the air gap distance (xL) is within a range from 0.1 to 0.3.

This structure too results in providing a high quality machine operation with reduced oscillation and noise and at the same time a highly efficient machine operation with reduced losses because torque ripple and the like are effectively lowered.

DESCRIPTION OF IMPLEMENTATION(S)

Referring to the accompanying drawings, implementations of the present invention are specifically explained below. FIGS. 1 through 10 show one implementation of an electric rotating machine according to the present invention.

Figure 1:
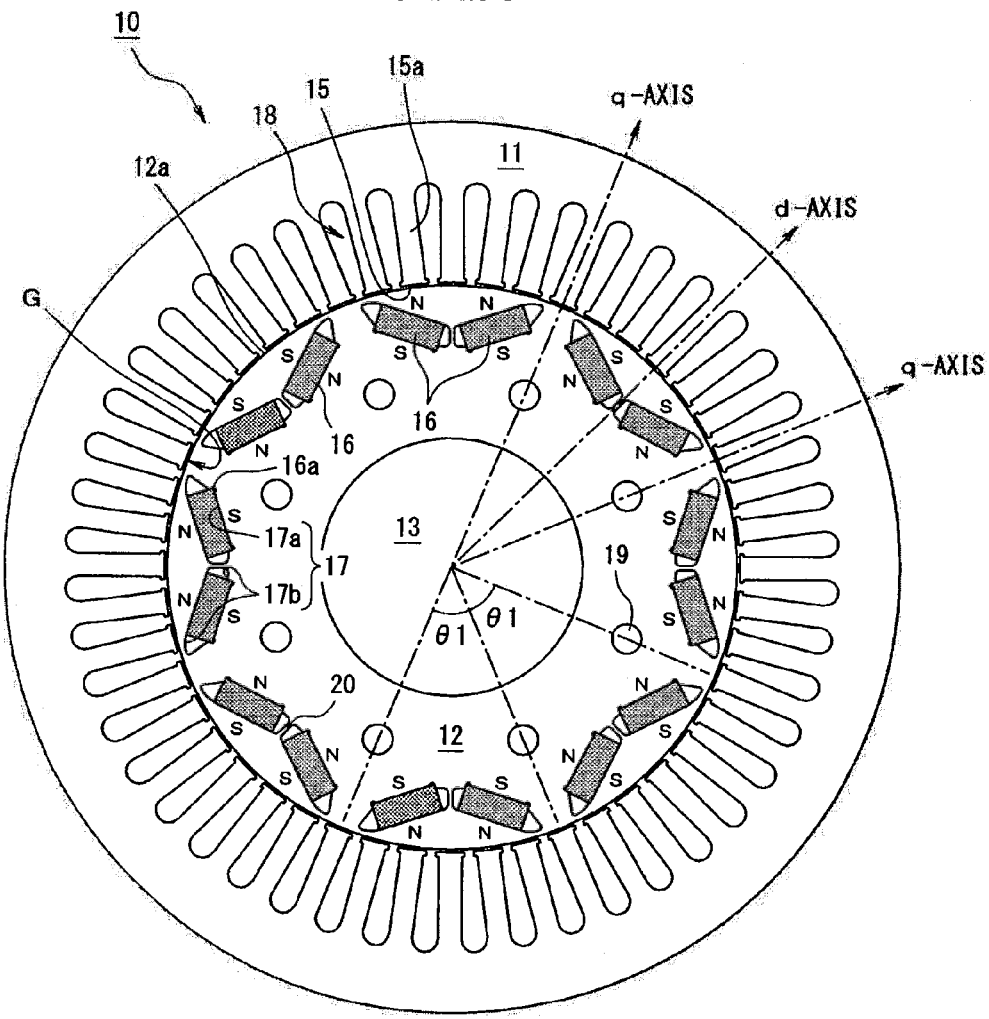
FIG. 1 is a plan view showing one implementation of an electric rotating machine according to the present invention, showing the outline of its overall structure.

In FIG. 1, an electric rotating machine (motor) 10 has a good performance for use in, for example, a hybrid electric car or electric car as a driving source in a manner similar to an internal combustion engine or as an in-wheel drive unit, and it includes a stator 11 formed in a cylindrical configuration and a rotor 12 rotatably received in the stator 11 with a rotor shaft 13 in a way that the rotor 12 is located on a rotor axis that is common to an axis for the stator 11.

The stator 11 is formed with a plurality of stator teeth 15 extending in radial directions towards the rotor axis with their inner periphery defining inner end surfaces 15a facing outer periphery surface 12a of the rotor 12 with an air gap G between them. The stator teeth 15 are wound to provide a three-phase distributed winding (not shown) to form coil windings configured to induce flux patterns for creation of rotor torque imparted to the rotor 12.

The rotor 12 is made as an interior permanent magnet (IPM) rotor which has embedded therein a plurality of sets, each set forming a magnetic pole and being a pair in this example, of permanent magnets 16 located in a "V" shape configuration opening towards the outer periphery surface 12a. The rotor 12 is formed with a plurality of pairs of bores 17 which are located in a "V" shape configuration opening towards the outer periphery surface 12a and extend axially through the rotor 12. The bores 17 of each pair include a pair of bore sections 17a in which the permanent magnets 16 of each pair, which are tabular magnets, are accommodated and kept immobile with their corners 16a each inserted into and held in a face-to-face relationship to the adjacent two angled inner walls defining the corresponding bore section 17a. Each of the bores 17 includes two space sections 17b that are located on the opposite sides of one of the tabular magnets 16 and spaced in a width direction of the magnet 16 and function as flux barriers for restricting sneak flux (called hereinafter "flux barriers"). The bores 17 of each pair are provided with a center bridge 20 interconnecting the permanent magnets 16 of the associated pair in order to retain the permanent magnets 16 in appropriate position against the centrifugal force at high speed revolutions of the rotor 12.

In this electric rotating machine 10, the stator teeth 15 are angularly distant to provide spaces, as the slots 18, to accommodate coil windings, so that six stator teeth 15 cooperate with the corresponding one of eight sets of permanent magnets 16, in other words, six (6) slots 18 face one of eight sets of permanent magnets 16. For this reason, the electric rotating machine 10 is configured to act as an 8-pole 48-slot three-phase IPM motor including eight (8) magnetic poles (four pairs of magnetic poles) for eight (8) sets of permanent magnets 16, in which N-poles and S-poles of the permanent magnets 16 of each set are rotated 180 in mechanical degrees with respect to those of the adjacent set, and forty eight (48) slots 18 accommodating coil windings formed by a single phase distributed winding using six (6) slots 18 defining five (5) stator teeth 15. The illustrated labeling N and S are used for the convenience sake in this explanation, but they are not on the surfaces of the components.

This structure causes the electric rotating machine 10 to drive the rotor 12 and the rotor shaft 13 when the coil windings in the slots 18 are excited so that magnetic flux flow patterns pass from the stator teeth 15 into the rotor 12 inwardly from the outer periphery surface 12a because rotor torque is created by, in addition to magnet torque derived from attraction and repulsion by interaction of the magnetic flux flow patterns with flux flow patterns for the magnetic poles for the permanent magnets 16 of each set, reluctance torque tending to minimize magnetic flow paths for the magnetic flux flow patterns from the stator 11.

Figure 2:
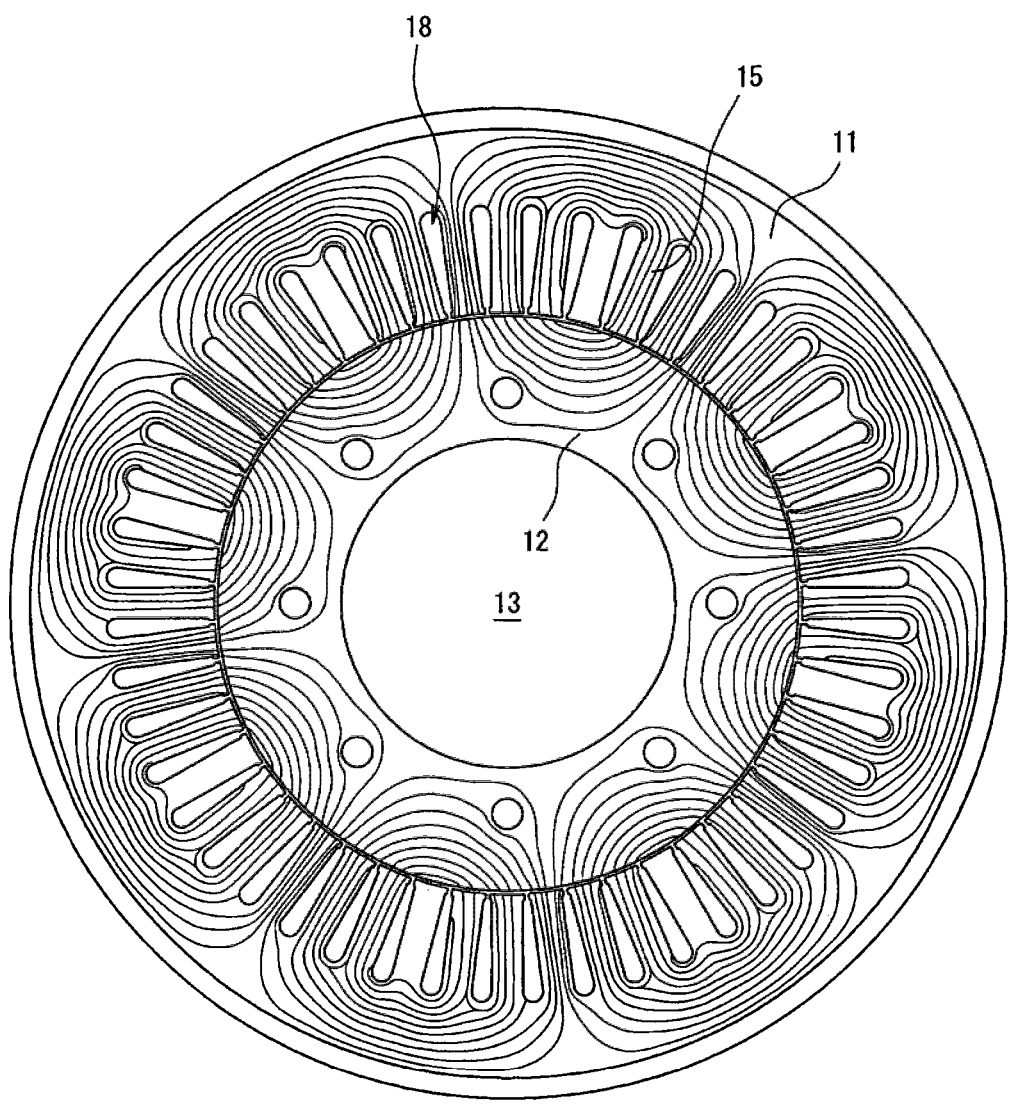
FIG. 2 is a plan view showing magnetic flux flow pattern produced by a stator of the machine when a rotor of the machine has no magnetic poles.

As shown in FIG. 2, the electric rotating machine 10 has the coil windings accommodated in the slots 18 formed by the distributed winding so as to provide a flux flow pattern, which includes distributed magnetic paths, from the stator 11 into the rotor 12 for each of a plurality sets of stator teeth 15 corresponding to one of the magnetic poles for the plurality pairs of permanent magnets 16. The V shape bores 17 of each pair for the permanent magnets 16 extend along the magnetic paths or, in other words, in a manner not to disturb formation of such magnetic paths. It is noted that laminations of magnetic steel such as, silicon steel or the like, are arranged in stacked axial relation to an appropriate thickness for a desired output torque and fastened by fastening screws using tappet holes 19 in a manufacturing process of the stator 11 and the rotor 12.

Figure 4:
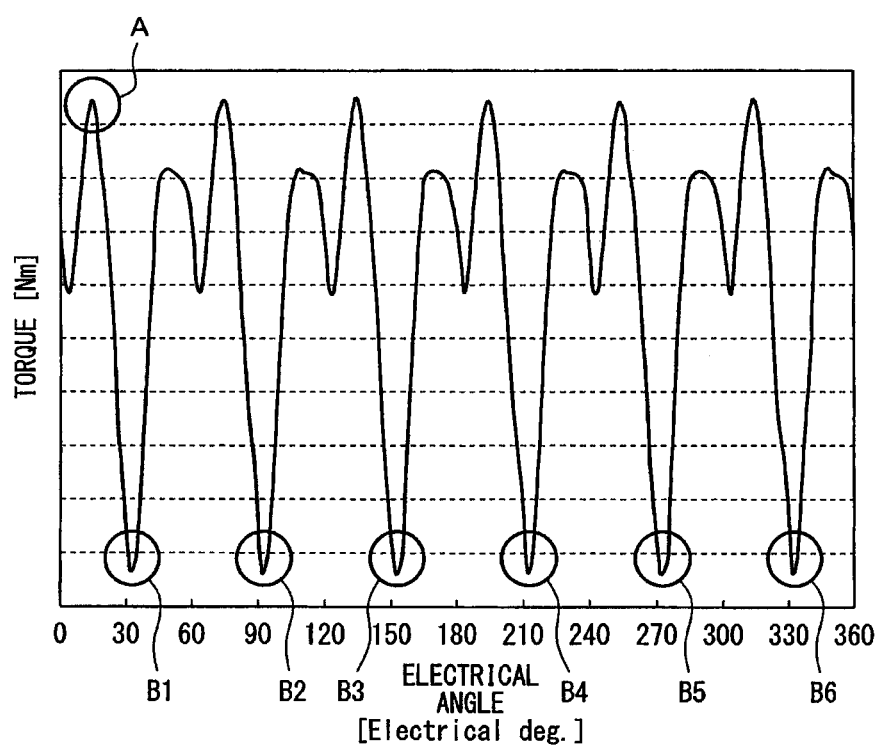
FIG. 4 is a graphical representation of a torque waveform illustrating the solution to accomplish the object of the present invention.

Considering now the electric rotating machine 10 employing the IPM structure in which the permanent magnets 16 are embedded in the rotor 12, the variation of the magnetic flux in one tooth of the stator teeth 15 of the stator 11 may be approximated by a square waveform shown in FIG. 4. Superposition of this fundamental magnetic flux wave and space harmonics of the lower order, the fifth ($5^{th}$) and the seventh ($7^{th}$) harmonic, are a factor that affects not only oscillation and noise experienced by the vehicle occupants, but also iron losses and a decrease in machine operating efficiency derived from a loss as thermal energy created by high torque ripple, (i.e., the difference between maximum and minimum torque during one revolution). Suppressing the space harmonics reduces the iron losses to improve machine operating efficiency with respect to input of electrical energy because hysteresis loss is the product of frequency and magnetic flux density and eddy current loss is the product of the square of frequency and magnetic flux density. Turning to FIG. 4 with the vertical axis representing magnetic flux and the horizontal axis representing time, the illustrated square waveform approximates the variation of the magnetic flux in one tooth of the stator teeth 15 over one cycle T (4L1+2L2) in electrical degrees in which no magnetic flux passes through the tooth for a duration L1 and magnetic flux with an amplitude passes forwardly through the tooth for a duration L2 of the first half of the cycle T and reversely through the tooth for the duration L2 of the second half of the cycle T.

Electromagnetic noise from the motor (electric rotating machine) is generated by oscillation of the stator caused by electromagnetic force acting on the stator. As the electromagnetic force acting on the stator, there exist radial electromagnetic force derived from magnetic coupling between the rotor and the stator and angular electromagnetic force derived from torque. Considering radial electromagnetic force acting on each of the stator teeth 15 with a linear magnetic circuit approximating the motor, the radial electromagnetic force fr and magnetic energy W can be expressed in the following formulae (1) and (2) as $$W = \frac{1}{2}\phi^2 R_g = \frac{1}{2}(B \cdot S)^2 \cdot \frac{x}{\mu S} = \frac{1}{2\mu}B^2 \cdot x \cdot S \tag{1}$$

$$fr = \frac{\partial W}{\partial x} = \frac{1}{2\mu}B^2 S \frac{\partial}{\partial x}(x) = \frac{1}{2\mu}B^2 S \tag{2}$$

where $\phi$ is the magnetic flux, W is the magnetic energy, fr is the radial electromagnetic force, Rg is the reluctance, B is the magnetic flux density, S is an area through which the magnetic flux passes, x is the air gap (G) length, and $\mu$ is the permeability in magnetic path.

Taking space harmonics into account, the flux density B can be expressed as shown in the following formula (3), so it follows that the superposition of the fundamental and the space harmonics is a factor that increases the radial electromagnetic force fr because the radial electromagnetic force fr includes the square of the flux density B. Diligent examination and study by the inventor has proven that reducing the space harmonics lowers torque ripple, resulting in realization of not only a reduction in motor electromagnetic noise, but also an improved machine operating efficiency.

$$B = \sum_{t=1}^{t} Bt \sin t(\theta + \delta t) \tag{3}$$

Inventor's diligent examination and study have proven also that torque ripple in an IPM three-phase motor results from the $6f^{th}$ (where f=1, 2, 3, . . . : the natural number) harmonic components at $\theta$ in electrical degrees, which result from combining, with respect to one phase for one magnetic pole, space harmonics with time harmonics contained in the input phase current supply.

More precisely, three-phase output P(t) and torque $\tau$(t) can be given by the expressions in the following formulae (4) and (5).

More precisely, three-phase output P(t) and torque $\tau$(t) can be given by the expressions in the following formulae (4) and (5).

$$P(t)=E_u(t)I_u(t)+E_v(t)I_v(t)+E_w(t)I_w(t)=\omega_m \tau(t) \tag{4}$$

$$\tau(t)=[E_u(t)I_u(t)+E_v(t)I_v(t)+E_w(t)I_w(t)]/\omega_m \tag{5}$$

where $\omega_m$ is the angular velocity; $E_u$(t), $E_v$(t) and $E_w$(t) are the U phase, V phase and W phase induced voltages, respectively; and $I_u$(t), $I_v$(t) and $I_w$(t) are the U phase, V phase and W phase currents, respectively.

Three phase torque is the sum of the U phase, V phase and W phase torques. Assuming that m is the order of harmonic component in the current and n is the order of harmonic component in the voltage, the U phase induced voltage $E_u$(t) can be written as in the following formula (6) and the U phase current $I_u$(t) can be written as in the following formula (7), and the U phase torque $\tau_u$(t) can be given by the expression shown in the following formula (8).

$$E_u(t) = \sum_{n=1}^{n} E_n \sin n \cdot (\theta + \alpha_n) \tag{6}$$

$$I_u(t) = \sum_{m=1}^{m} I_m \sin m \cdot (\theta + \beta_m) \tag{7}$$

$$\tau_u(t) = \tag{8}$$

$$\frac{1}{\omega_m}\left[\sum_{n=1}^{n}\sum_{m=1}^{m} E_m I_m \left\{-\frac{1}{2}(\cos((n+m)\theta + n\alpha_n + m\beta_m) - \cos((n-m)\theta + n\alpha_n - m\beta_m))\right\}\right]$$

It is well known that phase voltage E(t) and phase current I(t) are symmetrical waves, so n and m are odd numbers only. It is further known that the V phase induced voltage $E_v$(t) and current $I_v$(t) for the V phase torque and the W phase induced voltage $E_w$(t) and current $I_w$(t) for the W phase torque are $+2\pi/3$ radians and $-2\pi/3$ radians shifted from the U phase induced voltage $E_u$(t) and current $I_u$(t) for the U phase torque, respectively. It is seen that, in the expression of the three-phase torque, terms with coefficient 6 only remain and all of the other terms are cancelled each other. It follows that the three-phase torque $\tau$(t) can be written as in the following formula (9).

$$\tau(t) = \frac{1}{\omega_m}\left[\sum_{n=1}^{n}\sum_{m=1}^{m} E_m I_m \left\{-\frac{1}{2}\{3\cos(6f\theta+s) - 3\cos(6f\theta+t)\}\right\}\right] \tag{9}$$

where $6f=n\pm m$ (f is the natural number), $s=n\alpha_n+m\beta_m$, $t=n\alpha_n-m\beta_m$.

It has become clear from the above formula that when the order n of space harmonics contained in the flux (induced voltage) and the order m of time harmonics contained in the phase supply current are combined to give the number 6f, torque ripples of the $6f^{th}$ order are generated in the three-phase AC motor because, as an induced voltage is known as the time derivative of a magnetic flux, the harmonics contained in the induction voltage for each phase are of the same order as the harmonics contained in one phase one magnetic pole flux of the same phase.

Now, torque ripples are generated in the three-phase motor upon superposition of the fundamental and space harmonics of the order n=5, 7, 11, 13 in sine-approximation method with, for example, only time harmonic of the order m=1 contained in phase current because torque ripples are generated when the order m of space harmonic in magnetic flux waveform of one phase for one magnetic pole and the order n of time harmonic in phase current of the same phase are combined to meet the condition that n±m=6f (f is the natural number).

Figure 3:
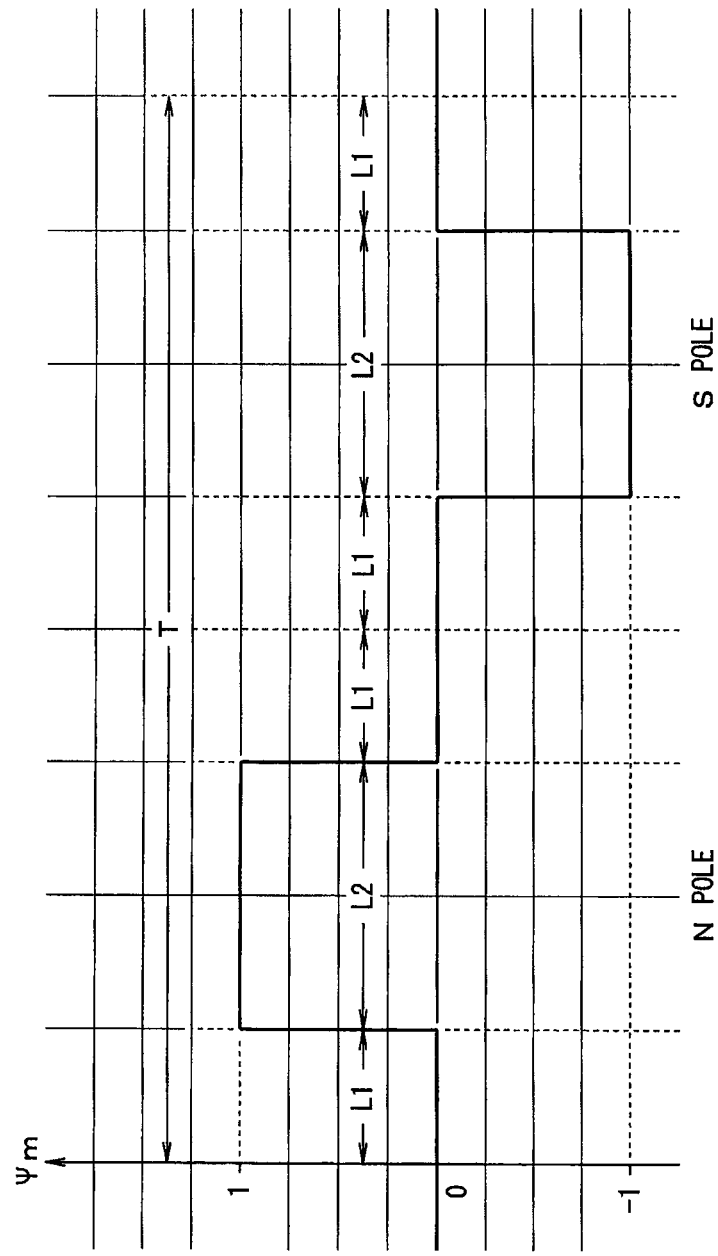
FIG. 3 is a graphical representation of a magnetic flux waveform illustrating a solution to accomplish the object of the present invention.

However, it is difficult to reduce torque ripple components resulted by the fifth ($5^{th}$) and seventh ($7^{th}$) space harmonics (n=5, 7), i.e., harmonics of $6^{th}$ order because 6f=6, because, as shown in FIG. 3, the flux waveform derived from flux linkage of magnetic field at one of the stator teeth 15 approximates square waveform and thus makes it easy for the $5^{th}$ and $7^{th}$ harmonics to superimpose the fundamental flux waveform.

Referring now to FIG. 4, having observed the illustrated torque waveform per one cycle in electric degrees resulting from simulation, it is found that the above-mentioned 3-phase IPM motor creates a pulsating torque that repeats the maximum torque A and the minimum torque B six times. Having evaluated the magnetic flux density distribution at each of times of the maximum torque A and minimum torque B events, it is found that the magnetic flux per stator tooth 15 at one of times of the minimum torque B events differs in level or density from that at another time and superimposition of space harmonics proportional to such difference causes an increase in torque ripples.

Figure 5:
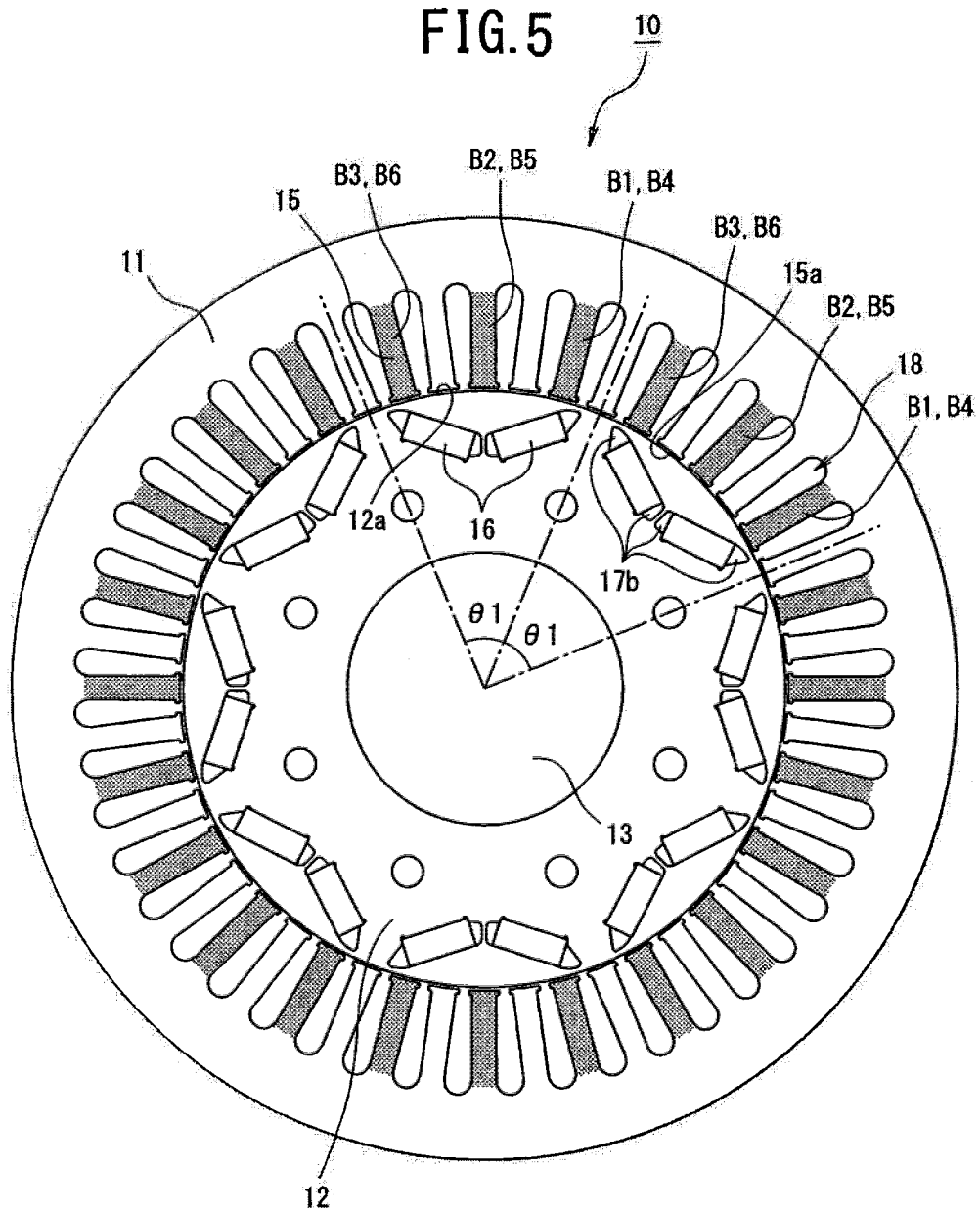
FIG. 5 is a plan view showing structural requirements of the implementation.
Figure 6:
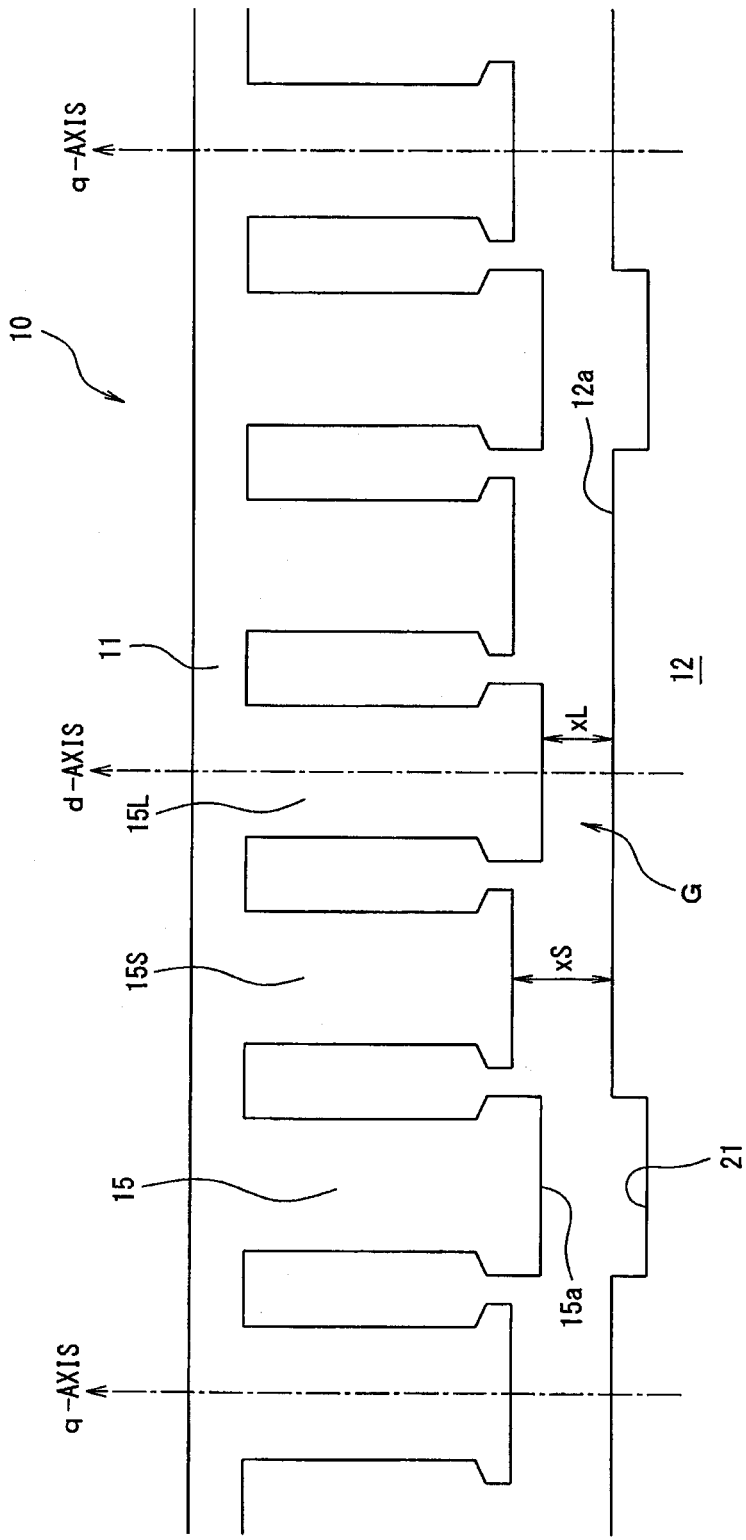
FIG. 6 is a fragmentary enlarged plan view of a model for the structural requirements of the implementation.

With regard to the magnetic flux density distribution at each of times B1 to B6 of the minimum torque B events, the magnetic flux density through one stator tooth 15 is larger or higher than that through an adjacent tooth during half of one cycle so that the same every other tooth is subject to such increased magnetic flux density per every half of one cycle as readily seen from FIG. 5 that illustrates only one cycle in electric degrees. It follows that superimposition of space harmonics proportional to the difference in magnetic flux density between every other tooth and an adjacent tooth results in an increase in torque ripples. Here, one cycle in electric degrees (360°) corresponds to twice a magnet opening angle θ1 for one magnetic pole opening angle of permanent magnets 16 of each pair including flux barriers 17*b*. In the electric rotating machine 10 in the form of an 8-pole 48-slot motor, one cycle of the rotor 12, i.e., one revolution through 360 in mechanical degrees, corresponds to four cycles in electric degrees because a set of six slots face one magnetic pole and two of eight (8) magnetic poles make one cycle.

It follows from the preceding description that in order to correspond to that every other tooth which is subject to the increased magnetic flux density at the times of the minimum torque B, the length of every other tooth is shortened to adjust a distance x between its inner periphery surface 15*a* and the outer periphery surface 12*a* of the rotor 12. For example, the magnetic flux density passing through such every other tooth is reduced by an increased reluctance caused by an increment d in distance through the air gap G by which the distance xS (D2) through the air gap G between the rotor outer periphery surface 12*a* and a shortened or short tooth (called second tooth) 15S is made longer than the distance xL (D1) through the air gap G between the rotor outer periphery surface 12*a* and a relatively long tooth (called first tooth) 15L. In other words, the stator teeth 15 include two kinds in length of teeth such that every other tooth is shorter than an adjacent tooth.

With regard to determination of the length of each of the short stator teeth 15S, a ratio of a difference between the length of each of the short stator teeth 15S and the length of each of the long stator teeth 15L to the length of each of the long stator teeth 15L, called a tooth length shrinkage ratio, (or a ratio of a difference between an air gap distance xS from each of the short stator teeth 15S to the outer periphery surface 12*a* of the rotor 12 and an air gap distance xL from each of the long stator teeth 15L to the outer periphery surface 12*a* of the rotor 12 to the air gap distance xL, called an air gap widening ratio δ) is determined by an electromagnetic field analysis using a finite element method in which the optimum conditions are found using the air gap widening ratio δ (d/xL) as a parameter, where d is the difference between the air gap distance xS and the air gap distance xL (d=xS−xL).

Figure 7:
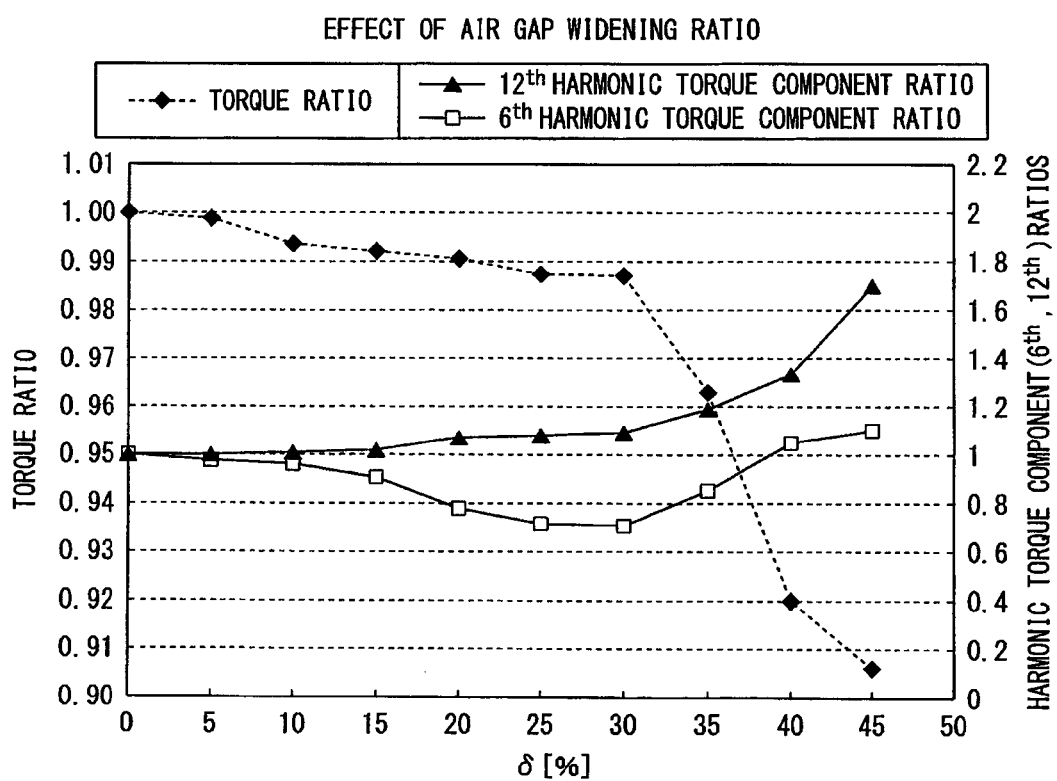
FIG. 7 is a graphical representation used to determine the structural requirements.

With the electromagnetic field analysis using the finite element method, an electric IPM motor including a stator with ununiform in length teeth has been evaluated against a conventional electric IPM motor including a stator with uniform in length teeth to give results, as shown in graphical representation of FIG. 7, after deriving a ratio between torque created by the ununiform in length teeth and that created by the uniform in length teeth, called a torque ratio, a ratio between the 6$^{th}$ order harmonic torque component of the torque created by the ununiform in length teeth and that of the torque created by the uniform in length teeth, called a 6$^{th}$ order harmonic torque component ratio, and a ratio between the 12$^{th}$ order harmonic torque component of the torque created by the ununiform in length teeth and that of the torque created by the uniform in length teeth, called a 12$^{th}$ order harmonic torque component ratio. As readily seen from the graphical representation of FIG. 7, all of the derived data are plotted against the air gap widening ratio δ based on given data when the air gap widening ratio δ is zero (i.e. distance x of air gap G is equal). No effect is found on a reduction in the 6$^{th}$ and 12$^{th}$ order harmonic when the ratio δ is lower than 0.1 (or 10%), the effect on a reduction in the 6$^{th}$ order harmonic disappears when the ratio δ is equal to or higher than 0.4 (or 40%), and the created torque itself drops in addition to an increase in the 12$^{th}$ order harmonic when the ratio δ exceeds 0.3 (or 30%).

This clearly shows an effect of reducing the 6$^{th}$ order harmonic torque component without any considerable drop in the torque when the air gap widening ratio δ is in the range specified by the following condition 1, a more reduction in the 6$^{th}$ order harmonic torque component when the air gap widening ratio δ is in the range specified by the following condition 2, and a more effective reduction in the 6$^{th}$ order harmonic torque component when the air gap widening ratio δ is in the range specified by the following condition 3.

$$0.1 \leq \delta(=d/xL) \leq 0.3 \quad \text{Condition 1}$$

$$0.2 \leq \delta(=d/xL) \leq 0.3 \quad \text{Condition 2}$$

$$0.25 \leq \delta(=d/xL) \leq 0.3 \quad \text{Condition 3}$$

Figure 8:
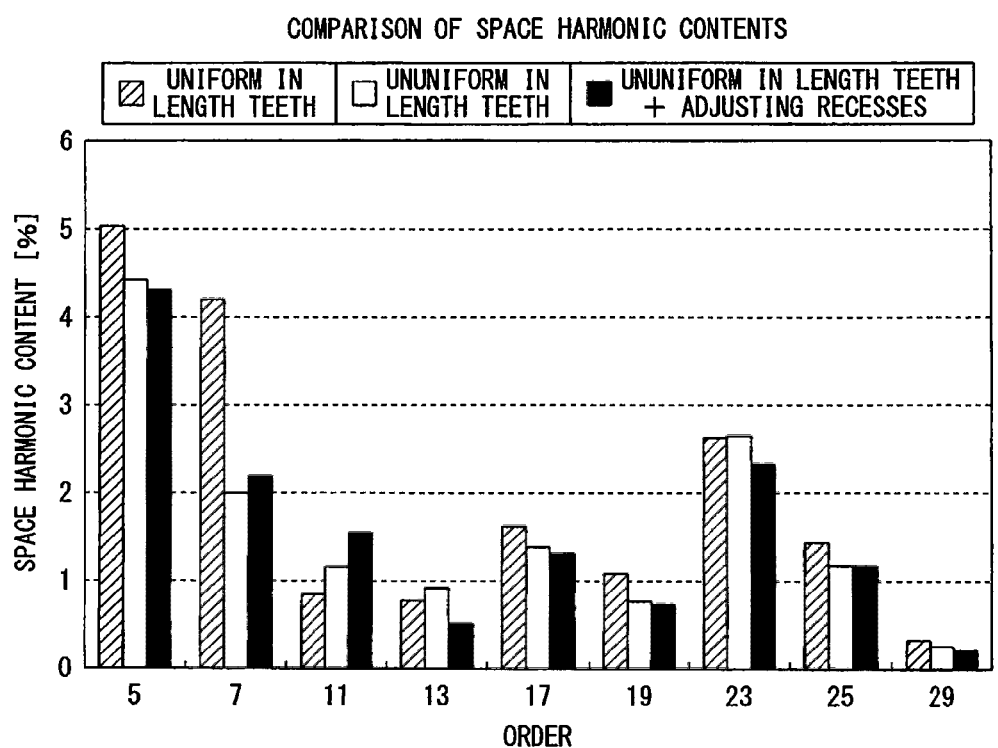
FIG. 8 is a graphical representation used to verify the effects of the structural requirements.

The bar chart of FIG. 8 clearly shows a reduction in the 5$^{th}$ space harmonic content and a reduction in the 7$^{th}$ space harmonic content, each of which causes the 6$^{th}$ order harmonic torque component in superimposition on induced voltage, when the length of each of short stator teeth 15S of the stator 11 in the electric rotating machine 10 is adjusted so that the air gap widening ratio δ is within, for example, the range specified by the above-mentioned condition 3. This clearly brings about a reduction in the 6$^{th}$ order harmonic torque component, which is considered to be more difficult to be reduced than the 12$^{th}$ order harmonic torque component.

Figure 9:
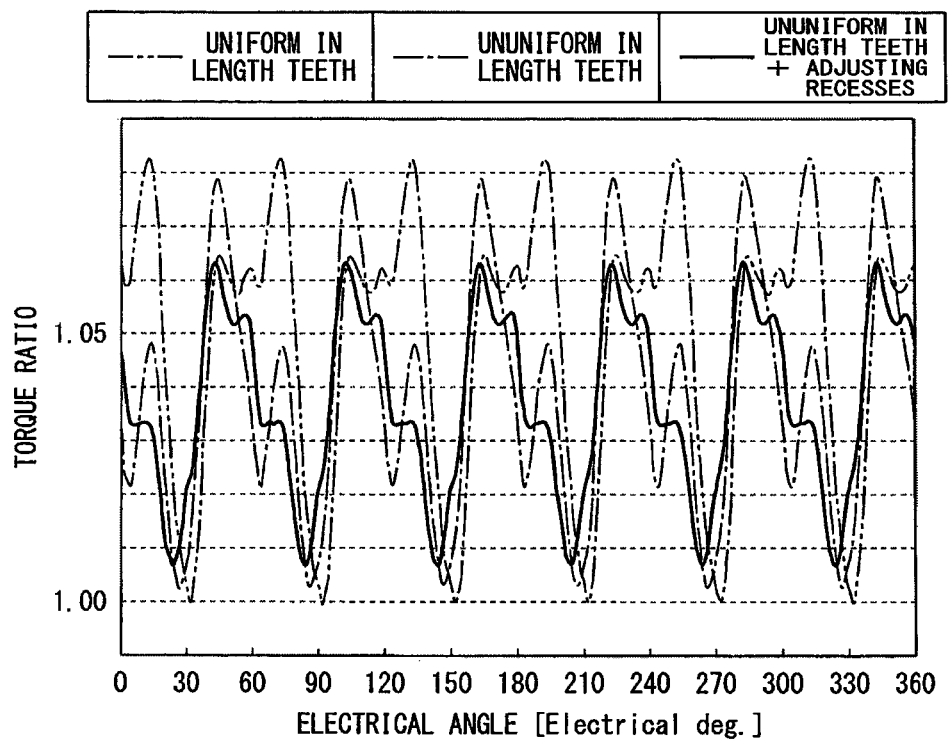
FIG. 9 is a different graphical representation from FIG. 8 used to verify the effects of the structural requirements.

Similarly, with reference to the one-dot chain line curve in FIG. 9, this brings about a reduction in torque ripple, which may make the car driver to feel discomfort by torque that changes greatly and rapidly within a short period of time when the stator teeth 15 with uniform length are used, without any ill influence on peak-to-peak torque curve. Thus, this electric rotating machine 10 turns out to be capable of adjusting output torque to torque curve that changes quietly.

Figure 10:
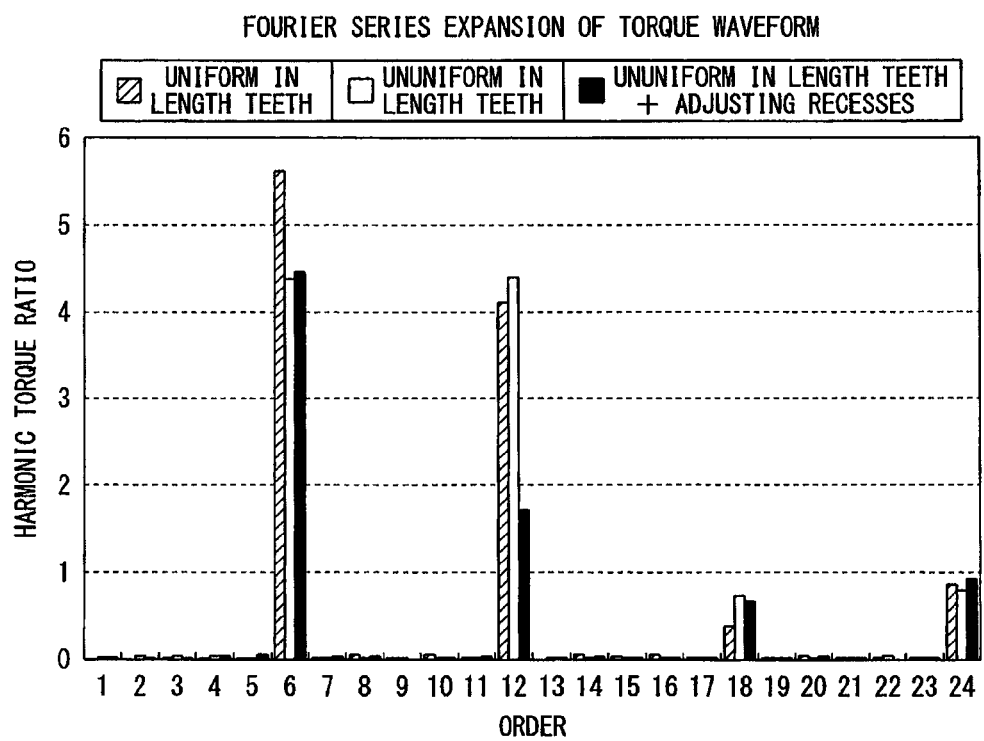
FIG. 10 is a different graphical representation from FIGS. 8 and 9 used to verify the effects of the structural requirements.

Fourier series expansions of torque waveform shown FIG. 10 confirms that the electric rotating machine 10 with its nonuniform stator teeth 15 in length is capable of reducing the 6$^{th}$ harmonic torque component that is more difficult to be reduced than the 12$^{th}$ harmonic torque component as compared to the case that the stator teeth are uniform in length although the 12$^{th}$ harmonic torque component is left in the same level.

Reduction of, in particular, the 6$^{th}$ harmonic component of torque in superimposition of the fundamental torque waveform is difficult in the case the stator teeth 15 of the stator 11 in the electric rotating machine 10 are uniform in length. However, an effective reduction in torque ripple is accomplished only by forming every other stator tooth as a short tooth 15S that meets the condition $0.1 \le \delta(=d/xL) \le 0.3$ or preferably the condition $0.2 \le \delta(=d/xL) \le 0.3$ or preferably the condition $0.25 \le \delta(=d/xL) \le 0.3$.

In the electric rotating machine 10 in the form of a 3-phase IPM motor in which twelve (12), in number, slots 18 face one of magnetic poles, magnetic reluctance is high at each of twelve (12) places during one cycle in electric degrees because permeance of air in opening of each of the slots 18, called a "slot opening", (i.e. a gap between edges of two adjacent stator teeth 15 to allow entry of a coil) to admit flow of magnetic flux is low. The magnetic reluctance at each of the slots 18 on such 12 places causes superimposition of the $11^{th}$ and $13^{th}$ order space harmonics (n=11, 13) on the magnetic flux waveform.

These $11^{th}$ and $13^{th}$ order space harmonics (n=11, 13), so-called "slot harmonics", may be easily reduced by staggering timing of magnetic reluctance in each of the slots 18 by rotating the permanent magnets 16 with respect to the rotor axis by a skew angle that is determined depending on an axial position of the magnets 16. However, the before-mentioned measure to give a skew angle in the rotor 12 poses a problem that it causes a difference at interfaces of the adjacent pairs of permanent magnets 16 and a deterioration of the rate of magnetization at the interfaces of the adjacent pairs of permanent magnets 16.

Figure 11:
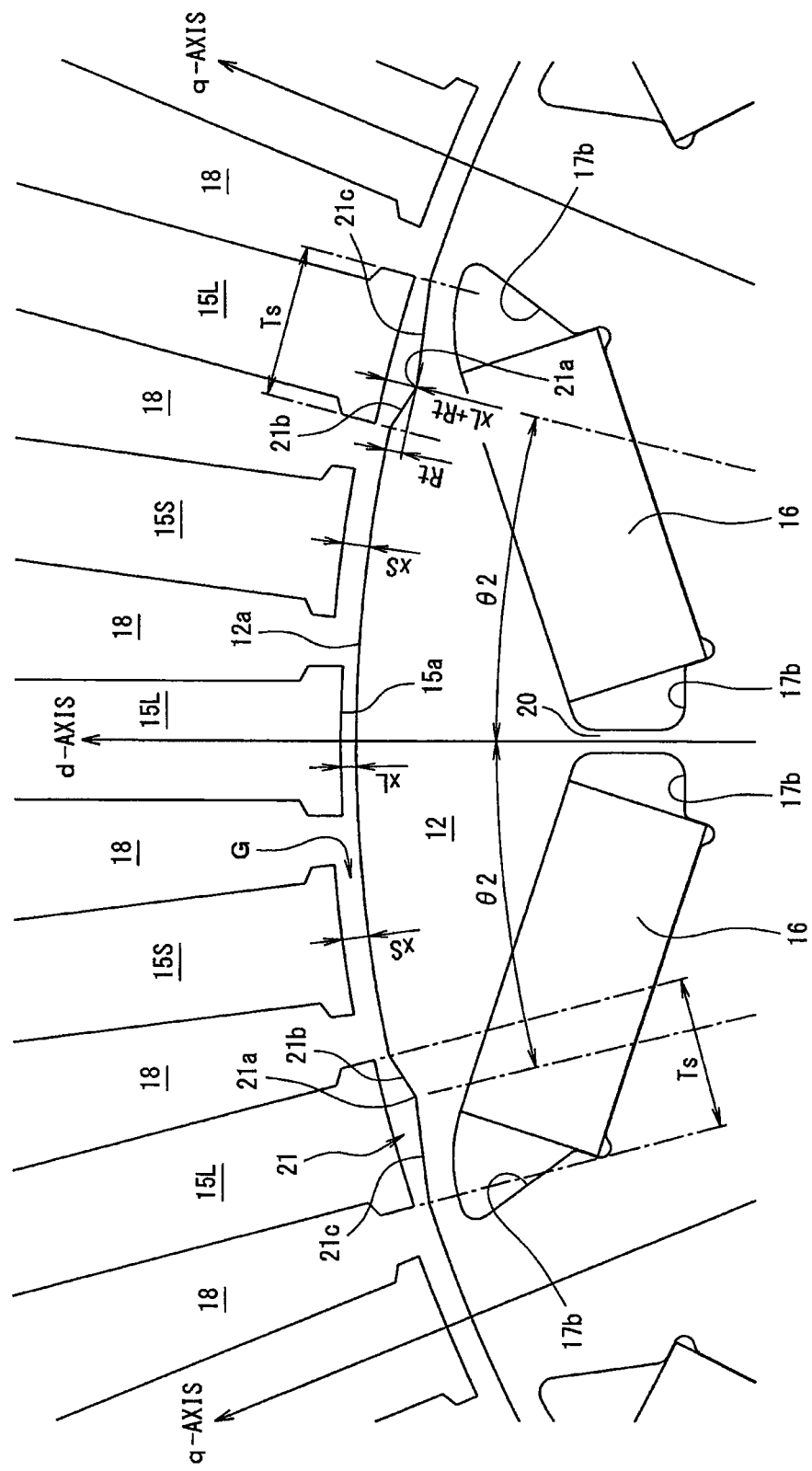
FIG. 11 is a magnified fragmentary showing constituent element condition of a portion of the present implementation with their dimensions greatly deformed for ease of distinction.

This has inspired the inventor to do earnest research and develop this electric rotating machine 10. As shown in FIG. 11, the electric rotating machine 10 is formed with concave adjusting recesses 21 to restrain the $12^{th}$ torque harmonic component derived from the $11^{th}$ and $13^{th}$ order space harmonics from appearing by raising magnetic reluctance with respect to magnetic flux passing through each of specified ones of the stator teeth 15. Each of the adjusting recesses 21 is formed in the outer periphery surface 12a of the rotor 12 at that location which the inner periphery surface 15a of one of the specified stator teeth 15 faces when the rotor 12 seeks to rest, thereby to lower permeance to raise magnetic reluctance and make it possible to give a high quality waveform by adjusting the superimposed high order torque harmonic component. In FIG. 11, the long and short stator teeth 15L and 15S are shown with their ratio of length greatly deformed for ease of distinction, and so the adjusting recesses 21.

Each of the adjusting recesses 21 is formed in the outer periphery surface 12a of the rotor 12 at a location given by and with a shape by performing electromagnetic field analysis using finite element method to determine the optimum conditions of the adjusting recess 21 in location and depth of the deepest level 21a between a circumferentially inward slope 21b near the d-axis and a circumferentially outward slope 21c remote from the d-axis of one of the magnetic poles.

More particularly, the location of the deepest level 21a of the adjusting recess 21 is determined by performing electromagnetic field analysis using finite element method. This analysis is performed using parameters Rt, Ts and θ2 with Rt and Ts kept constant. Rt is the recess depth, i.e. the depth to the deepest level 21a of the adjusting recess 21 from the outer periphery surface 12a of the rotor 12. Ts is the recess width, i.e. the circumferential width between the outer margin of the slope 21b of the adjusting recess 21 and the outer margin of the slope 21c thereof, which is made equal to the circumferential width of the inner periphery surface 15a of one of the stator teeth 15 facing the adjusting recess 21. θ2 is the angular displacement, i.e. the angle of forward or rearward rotation about the axis of the rotor 12 from the d-axis of one magnetic pole (i.e. an axis about which the permanent magnets 16 of each pair are symmetrical) which the adjusting recess 21 is associated with to the direction in which the deepest level 21a of the adjusting recess 21 is observed from the axis of the rotor 12. In the present implementation, the adjusting recess width Ts is made equal to the circumferential width of the inner periphery surface 15a of the stator tooth 15 facing the adjusting recess 21, but it may be made shorter than the width of the facing inner periphery surface 15a. However, it is effective to receive all of the magnetic flux passing through the overall area of the facing inner periphery 15a of the stator tooth 15 for adjusting magnetic reluctance.

Figure 12:
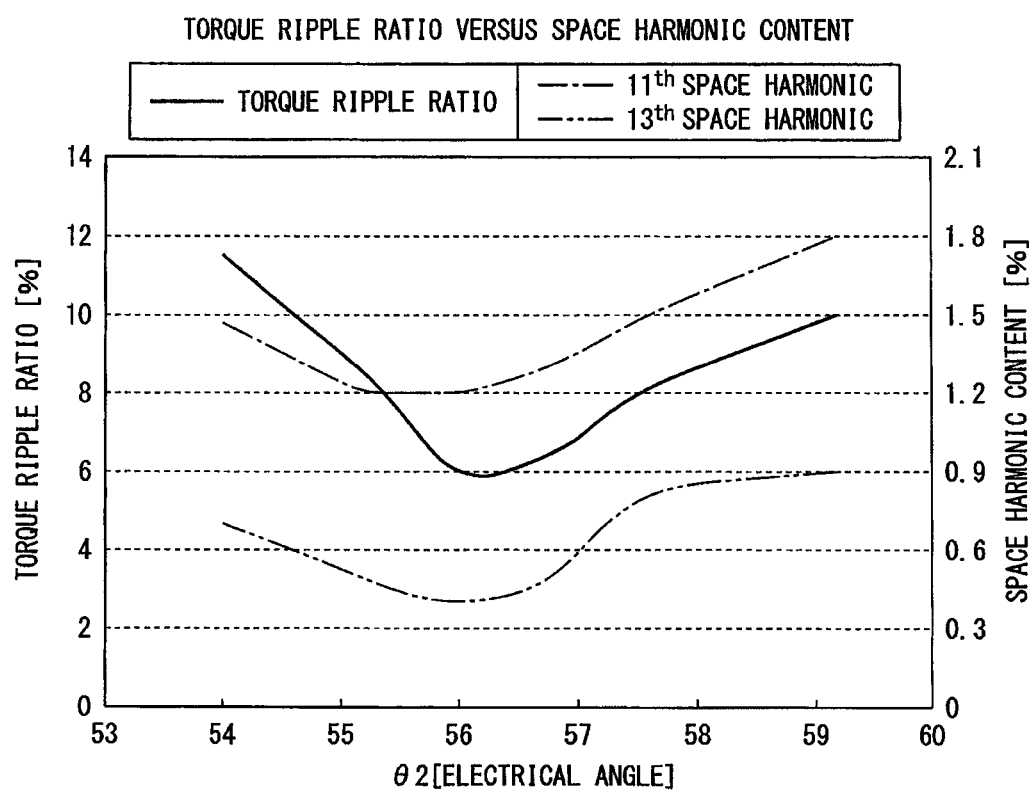
FIG. 12 is a graphical representation illustrating one way to determine condition of the structural requirements.

Electromagnetic field analysis by finite element method has been performed to derive the torque ripple factor and space harmonic components of the torque waveform influenced by the $11^{th}$ and $13^{th}$ space harmonics (n=11 or 13), giving the results shown in the graphical representation of FIG. 12. This graphical representation of FIG. 12 shows that the torque ripple factor and the $11^{th}$ and $13^{th}$ space harmonic components are the lowest level at 56° (in electrical degrees) of the displacement angle θ2, i.e. the angle of forward or rearward rotation about the axis of the rotor 12 from the d-axis of one magnetic pole to each of adjusting recesses 21 of a pair for the magnetic pole, and thus 56° (in electrical degrees) is the optimal value of the displacement angle θ2. The adjusting recesses 21 of each pair for one magnetic pole are formed in the outer periphery surface 12a of the rotor 12 at symmetrical, about a d-axis for the magnetic pole, locations, one location facing the inner periphery surface 15a of the next stator tooth 15L but one as observed in one circumferential direction from that relatively long stator tooth 15L which is on the d-axis, the other location facing the inner periphery surface 15a of the next stator tooth 15L but one as observed in the opposite circumferential direction from the relatively long stator tooth 15L on the d-axis, in a way that their deepest levels 21a are equidistant from the d-axis in one and the opposite circumferential directions angularly about the axis of the rotor 12 by the value 56° of the displacement angle θ2, thereby to adjust magnetic reluctance in the air gap G at a location, with a distance xL, between the outer periphery surface 12a of the rotor 12 and the inner periphery surface 15a of each of those relative long stator teeth 15L which are equidistant from the d-axis. It is noted that, in the present implementation, the torque ripple factor (Tr) is defined as or calculated by the following formula:

$$Tr(\%) = \frac{T\max - T\min}{Tav} \times 100$$

where Tmax, Tmin and Tav are, respectively, the maximal, minimal and average values of the torque.

With regard to determination of the appropriate value of the recess depth Rt of each of the adjusting recesses 21, electromagnetic field analysis by finite element method has been performed, with different values of the recess depth Rt of the adjusting recess 21 with its recess width Td kept at a fixed value, using, as a parameter, a ratio σ of the recess depth Rt to the distance xL (i.e. a distance between the mutually facing surfaces) between the outer periphery surface 12a of the rotor 12 and the inner periphery surface 15a of the relatively long stator tooth 15L facing the adjusting recess 21 (σ=Rt/xL).

Figure 13:
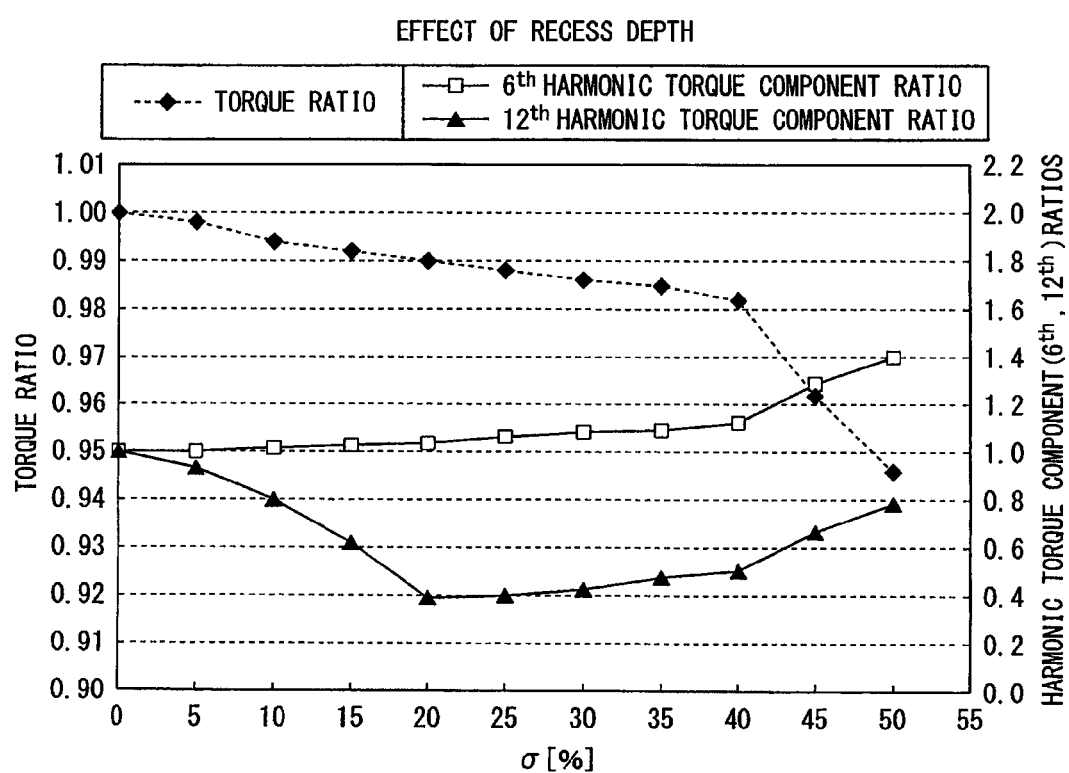
FIG. 13 is a graphical representation illustrating another different way to determine condition of the structural requirements.

The electromagnetic field analysis using the finite element method has derived a ratio between torque created by the construction with the adjusting recesses 21 and that created by the construction without such adjusting recesses, called a torque ratio, a ratio between the $6^{th}$ order harmonic torque component of the torque created by the construction with the adjusting recesses 21 and that of the torque created by the construction without such adjusting recesses, called a $6^{th}$ order harmonic torque component ratio, and a ratio between the $12^{th}$ order harmonic torque component of the torque created by the construction with the adjusting recesses 21 and that of the torque created by the construction without such adjusting recesses, called a $12^{th}$ order harmonic torque component ratio, thereby to give the results shown by the graphical representation of FIG. 13. As readily seen from the graphical representation of FIG. 13, all of the derived data are plotted against the ratio σ based on given data when the ratio σ is zero (i.e. without such adjusting recesses 21). In FIG. 13, the torque ratio is stable to the extent that it declines gradually as the recess depth Rt is made deep (i.e. as the ratio σ is made large), but it drops rapidly when the ratio σ (=Rt/xL) is made equal to or greater than 0.4 (or 40%). Further, the torque component ratio of the $6^{th}$ order harmonic torque component in the torque waveform is stable to the extent that it inclines gradually as the recess depth Rt is made deep, but it rises rapidly when the ratio σ (=Rt/xL) is made equal to or greater than 0.4 (or 40%). Furthermore, the torque component ratio of the $12^{th}$ order harmonic torque component in the torque waveform drops rapidly as the recess depth Rt is made deep, but it becomes stable to the extent that it rises gradually when the ratio σ (=Rt/xL) is made equal to or greater than 0.2 (or 20%). This graphical representation clearly shows an effect of reducing the $12^{th}$ order harmonic torque component without any considerable decline in the torque when the ratio σ (=Rt/xL), i.e. a ratio of the recess depth Rt to the distance xL between the outer periphery surface 12a of the rotor 12 and the inner periphery surface 15a of each of those relative long stator teeth 15L is within the range specified by the following condition 1, a further reduction in the $12^{th}$ order harmonic torque component when the ratio σ is within the range specified by the following condition 2, and a more effective reduction in the $12^{th}$ order harmonic torque component when the ratio σ is within the range specified by the following condition 3.

$$0.2 \leq \sigma(=Rt/xL) \leq 0.4 \qquad \text{Condition 1}$$

$$0.2 \leq \sigma(=Rt/xL) \leq 0.3 \qquad \text{Condition 2}$$

$$0.2 \leq \sigma(=Rt/xL) \leq 0.25 \qquad \text{Condition 3}$$

As with the case when stator 11 is formed with the ununiform, in length, stator teeth 15, the ball bar chart of FIG. 8 shows a reduction in the $5^{th}$ space harmonic content and a reduction in the $7^{th}$ space harmonic content, each of which causes the $6^{th}$ order harmonic torque component in superimposition on induced voltage, when the recess depth Rt of each of the adjusting recesses 21 formed in the outer periphery surface 12a of the rotor 12 in the electric rotating machine 10 is adjusted so that the ratio σ is within, for example, the range specified by the above-mentioned condition 3. This clearly results in a reduction in the $6^{th}$ order harmonic torque component, which is considered to be difficult to be reduced.

In addition to the foregoing, with reference to the fully drawn curve in FIG. 9, this brings about a more reduction in torque ripple that may make the car driver to feel discomfort by torque that changes greatly and rapidly within a short period of time as compared to the case that the length of the stator teeth are adjusted in length, thus proving that this electric rotating machine 10 is capable of adjusting output torque to torque curve that changes quietly. Comparison of the fully drawn curve to the two-dot chain line curve in FIG. 9 shows a reduction in torque pulsation by about 30% as compared to the case that the stator teeth are uniform in length, and comparison of the fully drawn curve to the one-dot chain line curve in FIG. 9 shows a reduction in torque pulsation by about 25% as compared to the case that the stator teeth are adjusted nonuniform in length.

Fourier series expansions of torque waveform shown FIG. 10 clearly confirms an effect of the adjusting recesses 21 in that this electric rotating machine 10 is capable of not only reducing the $6^{th}$ harmonic torque component as effective as the case that the stator teeth 15 are nonuniform in length but also the $12^{th}$ harmonic torque component considerably.

Therefore, the electric rotating machine 10 is able to considerably reduce the $12^{th}$ order harmonic torque component too and thus reduce torque ripple in the most effective way by, in addition to adjusting the stator teeth 15 of the stator 11 in length, forming the adjusting recesses 21 in the outer periphery surface 12a of the rotor 12 at symmetrical, about a d-axis for each magnetic pole, locations, one location facing the inner periphery surface 15a of the next stator tooth 15L but one as observed in one circumferential direction from that relatively long stator tooth 15L which is on the d-axis, the other location facing the inner periphery surface 15a of the next stator tooth 15L but one as observed in the opposite circumferential direction from the relatively long stator tooth 15L on the d-axis, in a way that their deepest levels 21a are equidistant from the d-axis in one and the opposite circumferential directions angularly about the axis of the rotor 12 by the value 56° (electrical angle θ2). Specifically, all what is needed is to meet the condition that the ratio σ of the recess depth Rt with respect to the distance xL between the outer periphery surface 12a of the rotor 12 and the inner periphery surface 15a of the long stator tooth 15L is within the range specified by $0.2 \leq \sigma(=Rt/xL) \leq 0.4$ or preferably the ratio σ is within the range specified by $0.2 \leq \sigma(=Rt/xL) \leq 0.3$ or more preferably the ratio σ is within the range specified by $0.26 \leq \sigma(=Rt/xL) \leq 0.25$.

According to the present implementation, every other tooth of the stator teeth 15 of the stator 11 is a short tooth 15S that defines an air gap distance xS longer than an air gap distance xL defined by an adjacent long tooth 15L by an amount within a range restrained by the widening ratio δ (=d/xL)=0.1 to 0.3 (or 10% to 30%). Moreover, the adjusting recesses 21, in which the ratio σ (=Rt/xL) of the recess depth Rt with respect to the distance xL between the outer periphery surface 12a of the rotor 12 and the inner periphery surface 15a of the long stator tooth 15L is within the range 0.2 to 0.4 (or 20% to 40%), are in the outer periphery surface 12a of the rotor 12 at symmetrical, about a d-axis for each magnetic pole, locations, one location facing the inner periphery surface 15a of the next stator tooth 15L but one as observed in one circumferential direction from that relatively long stator tooth 15L which is on the d-axis, the other location facing the inner periphery surface 15a of the next stator tooth 15L but one as observed in the opposite circumferential direction from the relatively long stator tooth 15L on the d-axis, in a way that their deepest levels 21a are equidistant from the d-axis in one and the opposite circumferential directions angularly about the axis of the rotor 12 by the value 56° (electrical angle θ2). This causes a reduction in torque ripple by reducing not only the $6^{th}$ harmonic torque component but also the $12^{th}$ harmonic torque component in superimposition on the fundamental torque waveform. Accordingly, this provides an electric rotating machine capable of providing a high quality and efficient machine operation with reduced oscillation and noise by lowering torque ripple.

In the preceding description of the present implementation, there is explained as one example the structure in which a plurality of pairs of permanent magnets 16 are embedded in a rotor 12 in a way that the magnets of each pair are located in a "V" shape configuration. This present implementation is not limited to this example, but it may be applied to, for example, the arrangement in which permanent magnets are embedded in a rotor 12 in a manner to face the outer periphery surface 12a to provide the same effects.

During the preceding description of the present implementation, an electric rotating machine 10 in the form of an 8-pole 48-slot motor is taken as an example, but it not limited to this structure. The present invention may find its application in motors including six (6) slots to each magnetic pole, such as, a 6-pole 36-slot, 4-pole 24-slot, 10-pole 60-slot motor, by employing only θ1 in electric degrees in the range of the effective magnetic pole opening angle θ1.

It is not intended to limit the scope of the present invention to the embodiment illustrated and described. It should be appreciated that all of variants accomplishing equivalent effect(s) which are aimed at by the present invention exist within the scope of the present invention. It should be understood that various changes can be made in the function and arrangement of elements without departing from the scope of the present invention as set forth in the appended claims and the legal equivalents thereof.

INDUSTRIAL APPLICABILITY

It should be appreciated that, although one embodiment of the present invention has been described, it is just an example and not intended to limit the scope of the present invention. It should also be appreciated that a vast number of variants exist without departing from the spirit of the present invention.

EXPLANATION OF NOTATIONS 10 electric rotating machine
11 stator
12 rotor
12a outer periphery surface
13 rotor shaft
15 stator teeth
15a inner periphery surface
15L long stator tooth
15S short stator tooth
16 permanent magnet
16a corner portion
17 bores which are located in a "V" shape
17b flux barrier
18 slot
20 center bridge
21 adjusting recess
21a deepest level
21b, 21c slopes
G air gap
Rt recess depth
Is recess width
xL, xS air gap distances
θ1 magnet opening angle
θ2 displacement angle

The invention claimed is:

1. An electric rotating machine comprising a rotor with a rotor shaft located on a rotor axis and a stator rotatably receiving the rotor,
wherein the stator includes a plurality of stator teeth that include long first stator teeth and short second stator teeth, each extending towards outer periphery surface of the rotor and terminating at inner periphery surface facing the outer periphery surface of the rotor, and a plurality of stator slots, each between an adjacent two of the stator teeth, providing spaces for winding coils around the stator teeth for input of driving electric power,
wherein the rotor has a plurality of permanent magnets embedded therein so as to let magnetic force act on each of those stator teeth which face the permanent magnets,
wherein the rotor within the stator is driven to rotate by reluctance torque derived from magnetic flux passing through the stator teeth, rear surface side of the stator teeth and the rotor when current passes through the coils and magnet torque in the form of attraction and repulsion derived from interference with the permanent magnets, and
wherein, when each of a plurality sets of permanent magnets of the plurality of permanent magnets corresponds to one of a plurality of stator slots of the plurality of stator slots and forms one of magnetic poles, magnetic reluctance between the inner periphery surface per stator tooth of the plurality of stator teeth and the outer periphery surface of the rotor is modified by forming the long first stator teeth to form a first gap extending along an axis of the rotor between the inner periphery surfaces of the plurality of stator teeth and the outer periphery surface of the rotor, and the short second stator teeth adjacent to the long first stator teeth to form a second gap extending along the axis of the rotor between the inner periphery surfaces of the plurality of stator teeth and the outer periphery surface of the rotor, the second gap longer in distance than the first gap, in such a way as to adjust torque fluctuation per stator tooth of said plurality of stator teeth upon relative movement of the one magnetic pole to the set of stator slots,
wherein the rotor is formed with a plurality of pairs of adjusting recesses, each pair per one of the magnetic poles, and the adjusting recesses of each pair are formed in the outer periphery surface of the rotor at symmetrical, about a central axis for the magnetic pole, locations,
wherein each of the magnetic poles in the rotor is formed by embedding one of the plurality of sets of permanent magnets so that permanent magnets of each set are a pair in number and located in a "V" shape configuration opening towards the outer periphery surface of the rotor,
wherein the stator slots of each set are six in number, and
wherein the adjusting recesses of each pair have deepest levels equidistant from a d-axis of the magnetic pole angularly about the axis of the rotor by an electrical angle of 56 in electrical degrees,
wherein each of the adjusting recesses meets the condition as follows:

$$0.2 \leq Rt/xL \leq 0.4,$$

where Rt is the depth of the deepest level of each of the adjusting recesses and xL is the air gap distance between an inner periphery surface of each of the first long stator teeth and the outer periphery surface of the rotor.

2. An electric rotating machine comprising a rotor with a rotor shaft located on a rotor axis and a stator rotatably receiving the rotor,
wherein the stator includes a plurality of stator teeth that include long first stator teeth and short second stator teeth, each extending towards outer periphery surface of the rotor and terminating at inner periphery surface facing the outer periphery surface of the rotor, and a plurality of stator slots, each between an adjacent two of the stator teeth, providing spaces for winding coils around the stator teeth for input of driving electric power, wherein the rotor has a plurality of permanent magnets embedded therein so as to let magnetic force act on each of those stator teeth which face the permanent magnets, wherein the rotor within the stator is driven to rotate by reluctance torque derived from magnetic flux passing through the stator teeth, rear surface side of the stator teeth and the rotor when current passes through the coils and magnet torque in the form of attraction and repulsion derived from interference with the permanent magnets, and wherein, when each of a plurality sets of permanent magnets of the plurality of permanent magnets corresponds to one of a plurality of stator slots of the plurality of stator slots and forms one of magnetic poles, magnetic reluctance between the inner periphery surface per stator tooth of the plurality of stator teeth and the outer periphery surface of the rotor is modified by forming the long first stator teeth to form a first gap extending along an axis of the rotor between the inner periphery surfaces of the plurality of stator teeth and the outer periphery surface of the rotor, and the short second stator teeth adjacent to the long first stator teeth to form a second gap extending along the axis of the rotor between the inner periphery surfaces of the plurality of stator teeth and the outer periphery surface of the rotor, the second gap longer in distance than the first gap, in such a way as to adjust torque fluctuation per stator tooth of said plurality of stator teeth upon relative movement of the one magnetic pole to the set of stator slots, wherein the rotor is formed with a plurality of pairs of adjusting recesses, each pair per one of the magnetic poles, and the adjusting recesses of each pair are formed in the outer periphery surface of the rotor at symmetrical, about a central axis for the magnetic pole, locations, wherein each of the magnetic poles in the rotor is formed by embedding one of the plurality of sets of permanent magnets so that permanent magnets of each set are a pair in number and located in a "V" shape configuration opening towards the outer periphery surface of the rotor, wherein the stator slots of each set are six in number, and wherein the adjusting recesses of each pair have deepest levels equidistant from a d-axis of the magnetic pole angularly about the axis of the rotor by an electrical angle of 56 in electrical degrees, wherein each of the first long stator teeth and each of the second short stator teeth meet the condition as follows:

$$0.1 \le d/xL \le 0.3,$$

where xL is the air gap distance between the inner periphery surface of each of the first long stator teeth and the outer periphery surface of the rotor, and d is the difference between an air gap distance xS between the inner periphery surface of each of the second short teeth and the outer periphery surface of the rotor and the air gap distance xL.

* * * * *